United States Patent Office

3,547,670
Patented Dec. 15, 1970

3,547,670
METAL OXIDE-PHOSPHORIC ACID COATINGS
Robert Joseph Fuchs and Charles William Lutz, Clark, and Leon Erwin Cohen, Somerset, N.J., assignors to FMC Corporation, New York, N.Y., a corporation of Delaware
No Drawing. Continuation-in-part of application Ser. No. 732,525, May 28, 1968. This application May 28, 1969, Ser. No. 828,728
Int. Cl. C08h 17/24
U.S. Cl. 106—286    8 Claims

ABSTRACT OF THE DISCLOSURE

Hard, adhesive binders and coatings, especially for metal, glass, ceramic or refractory surfaces, have been made by blending together one part by weight of superphosphoric acid having a concentration of 101 to 108% $H_3PO_4$, 0.02 to 0.10 part by weight of a glassy phosphate, alumina ($Al_2O_3$) in amounts to yield an $Al_2O_3:P_2O_5$ mole ratio of from about 2:3 to 3:1 (based on the $P_2O_5$ content derived from the superphosphoric acid), applying the resultant mixture to the surface of metal, glass, ceramic or refractory and heating the mixture on said surface until cured. Optional additives which further improve the above coatings or binders are silica ($SiO_2$) and titanium dioxide ($TiO_2$).

CROSS-REFERENCE TO RELATED APPLICATIONS

This application is a continuation-in-part of U.S. application Ser. No. 732,525, filed May 28, 1968 in the names of Robert J. Fuchs, Charles W. Lutz and Leon E. Cohen.

BACKGROUND OF THE INVENTION

Field of the invention

This invention relates to the production of hard, adhesive coatings and binders from blends of metal oxides and phosphorus-containing compounds for use in coatings or binders of metals, glass, ceramics or refractories.

Description of the prior art

It is known that certain combinations of zinc oxide and certain phosphorus compounds can produce hard, resistant coatings as reported in "Industrial and Engineering Chemistry Product Research and Development" (vol. 2, No. 2, June 1965, pp. 145–146). However, the type of phosphorus compounds which were effective were limited to certain organic phosphorus compounds, and the coatings varied in their effectiveness, depending upon the organic phosphorus compounds employed. Other workers have attempted to utilize phosphoric acid to supply phosphorus values to such compositions, but have met with only marginal success, and resulted in coating mixtures having extremely short pot lives, requiring that they be mixed immediately prior to use.

OBJECTS OF THE INVENTION

It is an object of the invention to produce a hard, adhesive coating from mixtures of metal oxides and inorganic phosphorus compounds that have good shelf lives and which give long, durable protection to metal and ceramic surfaces.

It is a further object of the invention to produce a binder for use in the manufacture of refractories, particularly alumina refractories, which have great strength and durability from mixtures of metal oxides and inorganic phosphorus compounds.

These and other objects will be apparent from the following description of the invention.

SUMMARY OF THE INVENTION

It has now been found that hard, adhesive binders and coatings for either metal, glass, ceramic or refractory surfaces can be formed by blending together one part by weight of 101% to 108% $H_3PO_4$ superphosphoric acid, 0.02 to 0.10 part by weight of a glassy metal phosphate, alumina ($Al_2O_3$) in amounts to yield an $$Al_2O_3:P_2O_5$$

mole ratio of from about 2:3 to 3:1 (wherein the $P_2O_5$ values are derived from said superphosphoric acid), applying the resulting mixture to the surface to be coated and heating said mixture until cured. Optional additives include $SiO_2$, in amounts to yield an $SiO_2:P_2O_5$ mole ratio of about 1:1 to 4:1 and $TiO_2$, in amounts to yield a $TiO_2:P_2O_5$ mole ratio of about 1:1 to about 4:1.

DESCRIPTION OF THE INVENTION AND THE PREFERRED EMBODIMENTS

In carrying out the present invention, a slurry is prepared by dispersing about 0.02 to about 0.10 part by weight of a glassy metal phosphate into 1 part by weight of a superphosphoric acid having a concentration of from about 101 to 108% and preferably 105% $H_3PO_4$. The term "glassy phosphate" refers to polyphosphate glasses produced by condensing molecules of orthophosphoric acid salts to form long-chained molecules having P—O—P bonds. The condensation is carried out by driving molecular water at high temperatures from the appropriate orthaphosphate salts. The polyphosphate glasses can contain only sodium cations or mixtures of sodium, aluminum, calcium or other such cations to modify the properties of the polyphosphate glasses. The preferred glassy phosphate is one containing an average of 6 to 40 phosphorus atoms per chain molecule. The preparation and properties of such glasses are fully reviewed in U.S. Patent 3,372,110, issued on Mar. 5, 1968 to R. J. Fuchs and U.S. Patents 2,539,304, issued Jan. 23, 1951 and 2,601,395, issued June 24, 1952, both to George B. Hatch. The glassy phosphate component is critical to the present invention and acts as a reaction modifier to prevent an overly exothermic reaction in the preparation of the resulting, coating or binder mixture.

The term "superphosphoric acid" refers to those phosphoric acids containing greater than 72.4% by weight of $P_2O_5$ in the solution, this amount representing a theoretical 100% orthophosphoric acid solution. The concentration of a phosphoric acid solution above 100% refers to the percent by weight of $P_2O_5$ beyond 72.4% which is present in the phosphoric acid solution. For example, a 105% $H_3PO_4$ solution would have 5% more $P_2O_5$ than 100% $H_3PO_4$, yielding a solution containing $$1.05 \times 72.4\% = 76.0\% \ P_2O_5$$

To the resulting mixture is then aded aluminum oxide ($Al_2O_3$). The form of aluminum oxide which is added is preferably the hydrated $Al_2O_3 \cdot 3H_2O$ form of the alumina, although anhydrous $Al_2O_3$ can also be used. The alumina is added in amounts to obtain a mole ratio of $Al_2O_3:P_2O_5$ of 2:3 to 3:1, with a ratio of 2:1 being preferred. Thereafter, if desired, an opacifier, namely $TiO_2$, may be added to the above mixture in amounts to yield a $TiO_2:P_2O_5$ mole ratio of about 1:1 to about 4:1. The $TiO_2$ can be in either the anatase or rutile forms, both being perfectly acceptable. The preferred mole ratio of $TiO_2:P_2O_5$ is about 2:1. Optionally, $SiO_2$ can also be added to the mixture in amounts to yield an $SiO_2:P_2O_5$ mole ratio of about 1:1 to 4:1. The resulting mixture is then stirred until it is completely homogeneous. The $SiO_2$ component is preferably finely powdered (−325 mesh), and alpha-quartz is preferred over either colloidal silica or silicic acid.

A resulting, typical homogenous mixture of the above components has the following composition:

| Component | Mole ratio | Parts by weight |
|---|---|---|
| $Al_2O_3$ | 2.0 | 1.2 |
| $SiO_2$ | 2.0 | 0.7 |
| $TiO_2$ | 2.0 | 0.9 |
| $P_2O_5$ (added as $H_3PO_4$) | 1.0 | 1.0 |
| Glassy phosphate (average molecular weight=1,050) | 0.008 | 0.06 |

When the above mixture is to be utilized to form a coating on a substrate, the following procedure is followed:

The above homogeneous mixture is coated on a substrate which is to be protected, such as iron, aluminum, mild steel, glass, ceramics, and the like, in a thin film. A coating of about 2 mils thick, for example, has been found to be perfectly satisfactory. The substrate with the coating thereon is then cured at temperatures of from about 100 to 400° C. with temperatures of about 200 to 300° C. being preferred. The curing time can range from about ¾ hour to 2 hours with about 1 hour being preferred. After curing, an extremely hard, adhesive coating is obtained which offers exceptional protection to the substrate.

When the previously described mixture is to be used as a binder for refractories, the following procedure is utilized:

A granular alumina refractory is mixed with the above-defined binder mixture until the total $P_2O_5$ of the aggregate mixture is about 1.25% to about 3%. Additional water is then added to obtain a grog having a desirable pressing consistency. The grog is then pressed at about 10,000 p.s.i. in a preformed mold to produce a brick. The pressed brick is then dried by heating it to 105° C. and by maintaining it at this temperature for 24 hours. The resulting "green brick" is then fired at a temperature of at least about 1000° C. for about 5 hours to cure the binder, and fire the alumina brick.

The following examples are presented by way of illustration only and are not deemed to be limiting of the present invention.

EXAMPLE 1

A series of coating slurries were prepared as follows:

(1) The glassy phosphates described in Table I were each dissolved in 10 grams of 105% superphosphoric acid. The 105% superphosphoric acid was previously stored in a closed polyethylene container to prevent it from absorbing atmospheric moisture which would change the acid concentration. The amount of glassy phosphate used is set forth in Table I as weight percent based on the weight of the superphosphoric acid. To facilitate the dissolution of the glassy phosphate, the mixture was heated to approximately 100° C. with stirring and then cooled to room temperature. Thereafter, 8.58 grams of powdered (−325 mesh) $TiO_2$ were dispersed in the phosphoric acid mixture, and the mixture was then diluted with 7.50 grams water. Thereafter, 17.04 grams of $Al_2O_3 \cdot 3H_2O$ powder were blended into the above mixture. This was followed by dispersing 6.42 grams of $SiO_2$ powder and blending the entire mixture until it was homogeneous.

Enameling-iron test coupons were then prepared as follows:

(1) The coupons were soaked for 9 minutes at 100° C. in an alkaline cleaner made up of 20 grams of the proprietary cleanser Spic & Span dissolved in 380 ml. of water. The coupon was then rinsed under hot and cold tap water, immersed in 75% $H_2SO_4$ for 5 minutes at 68° C. and then rinsed for 3 minutes at 25° C. in distilled water adjusted to the pH of 3.2 with $H_2SO_4$. The exposed coupon was then placed in a nickel sulfate solution containing 35.5 grams of $NiSO_4 \cdot 6H_2O$ and 2 grams sodium hypophosphite per gallon of solution for 8 minutes at a temperature of 71° C. The coupon was then rinsed for 3 minutes in distilled water at 25° C. which had been adjusted to a pH of 3.2 with sulfuric acid. The coupons were then neutralized for 5 minutes at 52° C. in a solution containing 1.55 grams sodium carbonate plus 1.47 grams of borax per liter of distilled water. Thereafter, the coupons were finally rinsed with distilled water and ethanol and air dried.

The coupons thus prepared were coated with the above slurry using a glass microscope slide to spread a uniform fluid slurry over the surface of the test coupons. The coated coupons were then cured for one hour at 250° C. and then allowed to cool. The cured coatings (approximately 2 mils thick) had the following composition:

| Component: | Mole ratio | Parts by weight |
|---|---|---|
| $Al_2O_3$ | 2.0 | 1.2 |
| $SiO_2$ | 2.0 | 0.7 |
| $TiO_2$ | 2.0 | 0.9 |
| $P_2O_5$ (added as $H_3PO_4$) | 1.0 | 1.0 |
| Glassy phosphate | 0-0.016 | 0-0.12 |

The thus treated coupons were then evaluated for hardness and adhesion using a Hoffman Hardness Tester which is essentially a four-wheeled carriage with a cylinder (as the scratching tool) mounted on the rear. Attached to the cylinder is a graduated beam equipped with a rider. Hardness was determined by observing the minimum effective mass (measured in grams) that had to be added to the beam to make a perceptible mark on the coating, either visually or by using a reading lens. The adhesion was measured by first scratching all the way through the film to the substrate and then placing the sharp edge of the tool at right angles to the scratch and increasing the load (in grams) on the graduated beam until the tool failed to ride up onto the coating and removed it cleanly from the substrate. The results of this test are set forth in Table I.

TABLE I

| | Glassy phosphate and chemical composition | Weight Percent | | | | | Weight percent of glassy phosphate used | Hardness, grams | Adhesion, grams |
|---|---|---|---|---|---|---|---|---|---|
| | | $P_2O_5$ | $Na_2O_5$ | CaO | $Al_2O_3$ | MgO | | | |
| Run No.: | | | | | | | | | |
| 1 | None | | | | | | 0 | 100 | 600 |
| 2 | Duraphos 225 | 67.0 | 27.75 | 3.5 | 1.75 | | 2 | 200 | 800 |
| 3 | do | 67.0 | 27.75 | 3.5 | 1.75 | | 5 | 200 | 700 |
| 4 | do | 67.0 | 27.75 | 3.5 | 1.75 | | 10 | 200 | 1,000 |
| 5 | Duraphos 226 | 67.0 | 26.25 | 4.5 | 2.25 | | 5 | 300 | 1,000 |
| 6 | Duraphos 227 | 67.0 | 21.0 | 8.0 | 4.0 | | 5 | 500 | 1,600 |
| 7 | Duraphos 228 | 67.0 | 18.0 | 10.0 | 5.0 | | 2 | 200 | 1,100 |
| 8 | do | 67.0 | 18.0 | 10.0 | 5.0 | | 5 | 600 | 1,800 |
| 9 | do | 67.0 | 18.0 | 10.0 | 5.0 | | 10 | 500 | 800 |
| 10 | Calgon 1 | 69.0 | 13.0 | 18.0 | | | 5 | 200 | 2,200 |
| 11 | Calgon 15 | 67.0 | 24.0 | 9.0 | | | 5 | 400 | 1,200 |
| 12 | Calgon 19 | 69.0 | 8.0 | 23.0 | | | 5 | 400 | 1,600 |
| 13 | Calgon 26 | 67.5 | 12.0 | 9.5 | | 11.0 | 5 | 300 | 900 |
| 14 | Sodaphos | 63.5 | 36.5 | | | | 5 | 300 | 1,000 |
| 15 | Glass H | 69.0 | 31.0 | | | | 5 | 300 | 700 |
| 16 | Glass E | 69.7 | 30.3 | | | | 5 | 200 | 900 |

EXAMPLE 2

A series of coatings were made up in the same manner as set forth in Example 1, except that the phosphoric acid concentration was varied from 85 to 115% $H_3PO_4$, and the weight of acid used was adjusted to give the same weight of $P_2O_5$ as in Example 1. All acids were previously stored in closed polyethylene containers to prevent absorption of atmospheric moisture which would change the acid concentration. These coatings all contained, as the glassy phosphate, Duraphos 228 described in Example 1. The resulting coatings were then tested for hardness and adhesion and for water resistance. The hardness and adhesion were tested as set forth in Table I using a Hoffman Hardness Tester, previously described, while the water resistance was determined by exposing the coupon (coated both sides and edges) to distilled water at a temperature of 90° C. for three consecutive one-hour periods. In these tests the water was kept in a constant state of agitation by continuous stirring. After each period the coupon was rinsed, dried, and weighed. The sum of the weight losses (reported in milligrams) is the "water resistance" of the coatings. These results are set forth in Table II.

TABLE II

| $H_3PO_4$ concentration, as percent $H_3PO_4$ | Water resistance, mg. | Hardness, grams | Adhesion, grams |
| --- | --- | --- | --- |
| 85 | (¹) | 400 | 900 |
| 101 | 18 | 400 | 1,300 |
| 105 | 1 | 600 | 1,800 |
| 108 | 27 | 200 | 1,400 |
| 115 | 34 | 400 | 1,300 |

¹ None, dissolved rapidly.

EXAMPLE 3

A series of coatings were prepared by the technique set forth in Example 1 using 105% $H_3PO_4$ and 5% of Duraphos 228. However, in these runs the mole ratio of aluminum to phosphorus was varied by keeping the aluminum concentration constant and varying the $P_2O_5$ content to give the desired ratio. These ratios are set forth in Table III. Further, the different coupons were cured at different temperatures for one hour as set forth in Table III. In some cases, as noted in Table III, the curing periods were ½ hour and 2 hours in place of 1 hour. Thereafter, the coatings were evaluated for hardness and adhesion using the Hoffman Hardness Tester set forth previously. The results of the testing are set forth in Table III.

TABLE III

| Al/P, mole ratio: | Curing temp., °C. | Hardness, grams | Adhesion, grams |
| --- | --- | --- | --- |
| 0.33:1 | 100 | (¹) | (¹) |
|  | 200 | (¹) | (¹) |
|  | 400 | (¹) | (¹) |
| 0.67:1 | 200 | 400 | 1,400 |
| 1:1 | 200 | 400 | 1,400 |
|  | 400 | 200 | 1,400 |
| 2:1 | 100 | 300 | 1,000 |
|  | 200 | 300 | 900 |
|  | 225 | 300 | 1,600 |
|  | 250 | 600 | 1,800 |
| 2:1 | ² 250 | 300 | 800 |
|  | ³ 250 | 600 | 1,200 |
|  | 290 | 700 | 1,000 |
|  | 400 | 800 | 2,000 |
| 3:1 | 100 | 200 | 700 |
|  | 200 | 200 | 1,500 |

¹ Brittle and blistered, readings difficult to make.
² Heated for ½ hour instead of 1 hour.
³ Heated for 2 hours instead of 1 hour.

EXAMPLE 4

A series of coatings were prepared by the technique set forth in Example 1 using about 5% Duraphos 228 dissolved in 105% $H_3PO_4$ and a mole ratio of $Al_2O_3:P_2O_5$ of 2:1. However, the $TiO_2$ and $SiO_2$ contents of the coatings were varied as set forth in Table IV. The resulting coatings were cured at 250° C. for one hour and were then evaluated for hardness and adhesion using a Hoffman Hardness Tester as previously described in Example 1. The results of this testing are set forth in Table IV.

TABLE IV

| Moles $TiO_2$ per mole $P_2O_5$ | Moles $SiO_2$ per mole $P_2O_5$ | Hardness, grams | Adhesion, grams |
| --- | --- | --- | --- |
| 0 | 0 | 100 | 800 |
| 2 | 0 | 500 | 1,200 |
| 4 | 0 | 300 | 1,400 |
| 0 | 2 | 400 | 700 |
| 0 | 4 | 400 | 800 |
| 4 | 2 | 300 | 1,600 |
| 2 | 4 | 600 | 1,000 |
| 1 | 1 | 300 | 1,600 |
| 2 | 2 | 600 | 1,800 |
| 3 | 3 | 500 | 1,200 |
| 4 | 4 | 400 | 1,200 |

EXAMPLE 5

Formula A

A charge of 13.44 g. of the glassy phosphate, identified as Duraphos 228 (identified as to its chemical composition in Table I), was dissolved in 263.2 g. of 105% superphosphoric acid. The 105% superphosphoric acid was previously stored in a closed polyethylene container to prevent it from absorbing atmospheric moisture which would change the acid concentration. To facilitate dissolving the glassy phosphate, the mixture was heated to approximately 100° C. with stirring, and then cooled to room temperature. Thereafter, the solution was diluted with 296.4 g. of water and 448.9 g. of −325 mesh powdered $Al_2O_3 \cdot 3H_2O$. The resulting mixture was then blended until it became homogeneous. The composition of the resulting mixture, expressed both in weight percent and mole ratio, is set forth in Table V.

Formula B

A solution of the glassy phosphate, Duraphos 228, in 105% superphosphoric acid was prepared as described in Formula A. Thereafter, 228 g. of −325 mesh $TiO_2$ powder were dispersed in the phosphoric acid, and the mixture was then diluted with 444 g. of water. Thereafter, 448.8 g. of −325 mesh $Al_2O_3 \cdot 3H_2O$ powder were blended into the entire mixture until it was homogeneous. The composition of the resulting mixture, expressed in terms of weight percent and mole ratio, is set forth in Table V.

Formula C

A solution of the glassy phosphate, Duraphos 228, in 105% superphosphoric acid was prepared as described in Formula A. Thereafter, there were added 228 g. of −325 mesh $TiO_2$ powder. The resulting mixture was agitated until all of the $TiO_2$ had been dispersed. Thereafter, the mixture was diluted with 592.8 g. of water. To this diluted mixture were then added 448.9 g. of −325 mesh $Al_2O_3 \cdot 3H_2O$ powder and blended into the resulting mixture, followed by the addition of 338.4 g. of −325 mesh $SiO_2$ powder. The entire mixture was then blended until homogeneous. The resulting composition of the slurry in terms of its weight percent and mole ratio is set forth in Table V.

The above formulations were then utilized as binders in the production of test bricks from an alumina aggregate. The alumina aggregate had a size distribution as follows:

| U.S. Standard Sieve: | Percent by weight |
| --- | --- |
| −¼ +8 | 16 |
| −8 +14 | 16 |
| −14 +28 | 18 |
| −28 +48 | 10 |
| −100 | 40 |

TABLE V.—SLURRY COMPOSITIONS

| | Sample A | Sample B | Sample C |
|---|---|---|---|
| Composition, percent by wt.: | | | |
| $Al_2O_3$ | 18.66 | 22.74 | 17.13 |
| $SiO_2$ | | | 9.87 |
| $TiO_2$ | | 16.19 | 13.19 |
| $P_2O_5$ (from $H_3PO_4$) | 28.72 | 13.66 | 11.68 |
| Glassy phosphate | 1.23 | 0.96 | 0.78 |
| Water | 51.30 | 46.45 | 47.35 |
| Mole ratio: | | | |
| $Al_2O_3$ | 2.0 | 2.0 | 2.0 |
| $SiO_2$ | | | 2.0 |
| $TiO_2$ | | 2.0 | 2.0 |
| $P_2O_5$ | 1.0 | 1.0 | 1.0 |
| Glassy phosphate (Av. Mol. wt. (total) 1,050) | 0.008 | 0.008 | 0.008 |

The alumina aggregate was charged into a blender, and the required amount of binder was blended into the aggregate. The relative ratio of aggregate and binder was that amount which would give a test brick having the desired $P_2O_5$ weight percent set forth in Table VI. The resulting mixture if the binder and aggregate was thoroughly mixed using a Hobart mixer for 3 minutes at low speed with a paddle-type blade. The required amount of water necessary to obtain a grog satisfactory for brick makeup was then slowly added, and mixing continued for an additional 3 minutes. The resulting grog was then placed in a press and pressed to a 6 x 1 x 1 inch brick at 10,000 p.s.i. using a Soiltest hydraulic unit. The resulting pressed bricks were then removed from the mold and dried for 24 hours at 105° C. After drying, the modulus of rupture on the dried bricks, termed "green strength," was determined on an Instron Tensile Tester, as set forth in A.S.T.M. C-133-55. Some bricks were fired at 1,000° C. for 5.5 hours, cooled and modulus of ruptures strengths were determined on these fired bricks (termed cold strength), as set forth in A.S.T.M. C-133-55. The results of these tests are set forth in Table VI.

EXAMPLE 4A

Process of the prior art

Identical bricks were made up using the same alumina aggregate, except that 85% phosphoric acid was used as the binder. However, in the makeup of these bricks it was found that about 4 weight percent of clay, based on the total mix, had to be added in order to obtain a brick which could be removed and handled from the mold. This was not true of the bricks made with the present binder in Example 4. The amount of $H_3PO_4$ used was sufficient to make a brick having the weight percent of $P_2O_5$ set forth in Table VI. The bricks were then tested for their modulus of rupture as set forth in A.S.T.M. C-133-55, and the results are set forth in Table VI.

As will be seen from the above Table VI, the samples A, B and C binder of the present invention gave substantially stronger green strengths and cold strengths than comparable amounts of phosphorus derived from the phosphoric acid. Moreover, the use of the present binders is advantageous, since a grog suitable for pressing into bricks can be obtained without the need for adding clay.

Pursuant to the requirements of the patent statutes, the principle of this invention has been explained and exemplified in a manner so that it can be readily practiced by those skilled in the art, such exemplification including what is considered to represent the best embodiment of the invention. However, it should be clearly understood that, within the scope of the appended claims, the invention may be practiced by those skilled in the art, and having the benefit of this disclosure otherwise than as specifically described and exemplified herein.

What is claimed is:

1. A novel coating and binder composition consisting essentially of one part by weight superphosphoric acid having a concentration of about 101 to 108% $H_3PO_4$, 0.02 to 0.10 part by weight of a polyphosphate glass resulting from condensing molecules of orthophosphoric acid salts, alumina in amounts to yield an $Al_2O_3:P_2O_5$ mole ratio of from about 2:3 to about 3:1, said $P_2O_5$ in said mole ratio being derived from the said superphosphoric acid.

2. The composition of claim 1 wherein $TiO_2$ is added in amounts to yield a $TiO_2:P_2O_5$ mole ratio of about 1:1 to about 4:1.

3. The composition of claim 1 wherein silica is added in amounts to yield an $SiO_2:P_2O_5$ mole ratio of about 1:1 to about 4:1.

4. The composition of claim 1 wherein the superphosphoric acid has a concentration of 105%, said polyphosphate glass has a chain length of from about 6 to 40, and said alumina is present in amounts to yield an $Al_2O_3:P_2O_5$ mole ratio of about 2:1.

5. Process of applying the composition of claim 1 to a substrate which comprises applying the composition in a thin layer on the surface of the substrate and heating the coated substrate to a temperature of from about 100 to 400° C. for a period of from about ½ hour to about 2 hours.

6. Process of claim 5 in which the coated substrate is heated to a temperature of about 250° C. for one hour.

7. Process of applying the composition of claim 1 as a binder to alumina refractories which comprises adding said composition to alumina aggregate and pressing the resulting mixture into bricks having a $P_2O_5$ level of from about 1.25 to about 3% by weight of said bricks.

8. Process of claim 7 wherein said bricks are fired to at least about 1000° C.

TABLE VI.—MODULUS OF RUPTURE

| Binder | 1.26% $P_2O_5$, green strength | 1.37% $P_2O_5$, green strength | 1.70% $P_2O_5$ Green strength | 1.70% $P_2O_5$ Cold strength | 2.75% $P_2O_5$ Green strength | 2.75% $P_2O_5$ Cold strength |
|---|---|---|---|---|---|---|
| Sample A | | 1,338 | | | 3,526 | 1,821 |
| Sample B | | 1,544 | 2,123 | 2,056 | | |
| Sample C | 1,484 | | | | | |
| 85% $H_3PO_4$ [1] | | 783 | | | 1,376 | 1,252 |

[1] Brick contained 4% by weight (total basis) of clay.

References Cited

UNITED STATES PATENTS

| | | | |
|---|---|---|---|
| 2,930,709 | 3/1960 | Harman | 106—38.9 |
| 3,278,328 | 10/1966 | Okrent | 106—55X |
| 3,359,124 | 12/1967 | Henry | 106—69X |
| 3,379,544 | 4/1968 | Burhans | 106—55 |

JULIUS FROME, Primary Examiner

L. B. HAYES, Assistant Examiner

U.S. Cl. X.R.

106—38.3, 38.9, 65, 69, 85; 117—53, 125, 129

UNITED STATES PATENT OFFICE
CERTIFICATE OF CORRECTION

Patent No. 3,547,670      Dated December 15, 1970

Inventor(s) Robert Joseph Fuchs et al

It is certified that error appears in the above-identified patent and that said Letters Patent are hereby corrected as shown below:

Column 2, line 31, "orthaphosphate" should read --orthophosphate--.

Column 2, line 58, "$Al_2O_3 \cdot 3H_2O$" should read --$Al_2O_3 \cdot 3H_2O$--.

Table I, "$Na_2O_3$" should read --$Na_2O$--.

Column 7, Table V, under Sample A, "1.23" should read --1.32--.

Column 7, Table V, under Mole ratio, "$P_2O_5$" should read --$P_2O_5$ (total)--.

Column 7, Table V, last line, "(total)" should be deleted.

Table VI, under Green strength, "3,526" should read --2,526--.

Table VI, last line, "$85\%H_3PO_4{}^2$" should read --$85\%H_3PO_4{}^1$--.

Signed and sealed this 1st day of February 1972.

(SEAL)
Attest:

EDWARD M. FLETCHER, JR.  
Attesting Officer

ROBERT GOTTSCHALK  
Commissioner of Patents